May 20, 1941.
A. S. HARTANOV
2,242,300
CARCASS TREATMENT
Filed Aug. 12, 1938
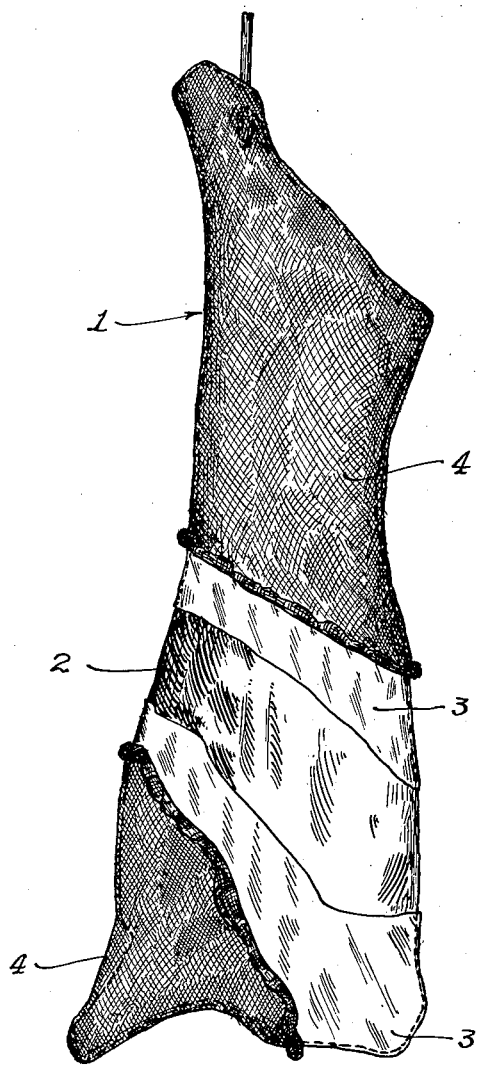
ATTEST -
Wm C. Meiser
Andrew S. Hartanov
INVENTOR
BY
ATTORNEY Patented May 20, 1941

2,242,300

UNITED STATES PATENT OFFICE 2,242,300

CARCASS TREATMENT

Andrew S. Hartanov, Chicago, Ill., assignor to Swift and Company, Chicago, Ill., a corporation of Illinois Application August 12, 1938, Serial No. 224,606

3 Claims. (Cl. 99—174)

This invention relates to the covering of edible animal carcasses including large subdivisions and wholesale cuts thereof.

Among the objects of the invention is the provision of an improved packaging method for the preservation of the prepackaged appearance of an edible animal carcass and the diminution of shrink in fresh meats during storage and transportation.

The invention is applicable to all types of edible animal carcasses and major portions thereof, and it will be described as applied to beef merely by way of example and not by way of limitation.

The drawing illustrates a side of beef 1 covered in accordance with the present invention with the covering broken away to show the manner of application. It will be noted that the surface of the meat 2 has been covered with a sheet of transparent cellulosic paper 3 over which has been applied a cloth bag 4 which is preferably prepared from export beef cloth or muslin.

I have found that the surface appearance of fresh meat may be preserved without substantial alteration during storage and transportation under normal refrigerated conditions, if the surface of the meat is covered with a sheet of transparent cellulosic material such as is commonly used in wrapping various articles of commerce, provided that the sheet cellulosic material is held firmly in place with a cloth covering and provided that the transparent cellulosic material is applied before all animal heat has been lost.

The method of the present invention may be carried out with a warm side of beef immediately after the hide has been removed, with a partially chilled side of beef which has been warm dressed and clothed with a salt shroud and with a carcass which has been partially chilled with the hide on.

In carrying out the invention upon a warm side of beef from which the hide has been removed any excess moisture is first wiped from the fatty surface. A sheet of transparent cellulosic material is then applied to the wiped surface and smoothed to fit the depressions and hollows in the conformation of the side. A dry outer cloth of muslin or beef export cloth is then applied and fastened to assure intimate contact between the transparent cellulosic material and the fatty surface during the handling and chilling period. This results in good adhesion of the transparent cellulosic material to the surface of the beef such that after thorough chilling the cloth may be removed if desired. The treatment does not bleach the fat which remains its natural yellow color.

Another method of carrying out the present invention is to dress beef in the conventional manner applying a tightly fitted brine moistened shroud to the warm side of beef to smooth the fat and aid in bleaching. After chilling three or four hours, the salt shroud is removed, sufficient salt remaining on the fat surface to continue the bleaching action. A transparent cellulosic sheet is then applied and the cloth tightly fitted over the transparent cellulosic sheet to assure close adherence between the cellulosic sheet and the meat surface. This procedure permits immediate partial bleaching of the fat without modifying the surface sufficiently to destroy the adhesive properties of the gelatinous serum naturally present on the beef surface which serves to hold the cellulosic sheet on the surface.

A third procedure which may be employed in carrying out the present invention involves first partially chilling the carcass before the hide has been removed. When this is done, it is found upon removal of the hide that there are no blood stains and the fat is white. The transparent cellulosic sheet material is promptly placed on the surface and the covering cloth applied in the same manner as has been described in connection with the other two modifications of the method of the present invention. Whichever procedure is followed it is found that the desired color and appearance of the carcass surface is preserved.

A satisfactory transparent cellulosic sheet material to employ in carrying out the present invention is substantially pure transparent cellulosic paper, 0.00088 inch in thickness.

In the claims which follow it will be understood that the term "skinned" as applied to an edible carcass refers to any carcass or wholesale portion thereof from which the hide, skin, or pelt has been removed.

I claim:

1. The method of treating skinned beef carcasses which comprises applying to the skinned surface a cloth covering moistened with salt brine, permitting the cloth to remain in contact with the surface of the carcass until the fat on the surface is partially bleached, removing the salt cloth before the carcass is entirely chilled and then promptly applying a covering of transparent cellulosic sheet material and a tight cloth covering to hold the transparent cellulosic sheet material in intimate contact with the surface of the carcass until adhesion is secured between the carcass surface and the transparent cellulosic sheet material.

2. The method of treating beef carcasses which comprises chilling the carcasses after slaughter sufficiently to partially remove the animal heat, thereafter removing the hide, promptly applying a covering of transparent cellulosic sheet material, and then holding the transparent cellulosic sheet material tightly in intimate contact with the surface of the carcass by the application of a cloth covering, until adhesion is secured between the transparent cellulosic sheet material and the surface of the carcass.

3. A method of treating skinned edible animal carcasses and large subdivisions thereof which comprises applying a brine moistened cloth to the warm carcass, partially chilling the clothed carcass, removing the cloth, then promptly applying a covering of transparent cellulosic material and holding the cellulosic material in intimate contact with the surface of the carcass by a tight cloth.

ANDREW S. HARTANOV.